US008509944B1

(12) United States Patent
Kranyec

(10) Patent No.: US 8,509,944 B1
(45) Date of Patent: Aug. 13, 2013

(54) SELF-STORAGE KIOSK

(75) Inventor: Stephen Kranyec, League City, TX (US)

(73) Assignee: Hold It Right There, Inc., Kemah, TX (US)

(*) Notice: Subject to any disclaimer, the term of this patent is extended or adjusted under 35 U.S.C. 154(b) by 966 days.

(21) Appl. No.: 12/589,242

(22) Filed: Oct. 20, 2009

Related U.S. Application Data

(60) Provisional application No. 61/196,818, filed on Oct. 20, 2008.

(51) Int. Cl.
*G06F 7/00* (2006.01)

(52) U.S. Cl.
USPC .......... 700/214

(58) Field of Classification Search
USPC .......... 700/214
See application file for complete search history.

(56) References Cited

U.S. PATENT DOCUMENTS

| | | | | |
|---|---|---|---|---|
| 4,087,020 | A | 5/1978 | Krakauer | |
| 4,317,604 | A | 3/1982 | Krakauer | |
| 4,927,051 | A | 5/1990 | Falk et al. | |
| 5,133,441 | A | 7/1992 | Brown | |
| 5,244,266 | A | 9/1993 | Maldanis | |
| 5,321,625 | A | 6/1994 | Humm et al. | |
| 5,360,134 | A | 11/1994 | Falk et al. | |
| 6,367,895 | B1 | 4/2002 | Huffman et al. | |
| 7,254,548 | B1 | 8/2007 | Tannenbaum | |
| 7,373,671 | B2 | 5/2008 | Gudorf | |
| 2001/0056311 | A1* | 12/2001 | Valerino, Sr. | 700/214 |
| 2003/0023541 | A1 | 1/2003 | Black et al. | |
| 2006/0259195 | A1* | 11/2006 | Eliuk et al. | 700/245 |

OTHER PUBLICATIONS

Photos of Cribmaster tool vending machines, printout of www.cribmaster.com/vending.html dated Sep. 8, 2009.

* cited by examiner

*Primary Examiner* — Ramya Burgess
(74) *Attorney, Agent, or Firm* — John R Casperson

(57) ABSTRACT

A storage kiosk is disclosed which comprises a cabinet, a carousel, a plurality of dividers, a drive means for rotating the carousel, and a plurality of latch means. The cabinet has a door defining a front surface of the cabinet. The door includes a plurality of openable panels vertically aligned. The panels are normally in a latched closed position. The carousel is rotatably mounted in the cabinet about a vertical axis and includes a plurality of shelves spaced along the vertical axis. The plurality of dividers are disposed on each of the shelves to define a plurality of compartments on each shelf for receiving items to be stored. The dividers and the shelves, in combination, define a plurality of compartments around the periphery of the carousel. The drive means is for rotating the carousel to bring respective ones of the compartments into alignment with respective ones of the panels. The pluralities of latch means are for selectively latching or unlatching a panel so that can be opened to place or remove an item from the compartment which was brought into alignment with the panel by the drive means.

19 Claims, 6 Drawing Sheets

SELF-STORAGE KIOSK

CROSS REFERENCES TO RELATED APPLICATIONS

This application claims the benefit of U.S. Provisional Application No. 61/196,818 filed Oct. 20, 2008, the disclosure of which is herein incorporated by reference.

FIELD OF THE INVENTION

One embodiment of the invention relates to a public kiosk for the temporary storage of personal items, for example, lighters, pocket knives, cameras and cell phones.

BACKGROUND OF THE INVENTION

Some personal items are unwanted or unsafe in certain locations, and persons wanting to enter such locations generally have to go through a check point that may include a metal detector and X-ray equipment and give up these items.

For example, in petrochemical plants, matches and lighters are generally prohibited. In courthouses, cell phones and cameras are generally prohibited. In US government buildings, pocket knives are generally prohibited.

A secure storage device for temporarily storing items such as these is much needed.

A system which provides customer assistance for use of the device at a remote site would facilitate providing the service economically.

OBJECTS OF THE INVENTION

It is an object of this invention to provide a storage kiosk which can be placed at facility check points and screening areas to provide for temporary storage and subsequent retrieval of restricted or prohibited items.

It is a further object of this invention to provide a storage kiosk which is secure and reliable enough to obviate the need for an attendant.

It is a further object of this invention to provide a system for operating a storage kiosk which provides for customer assistance from a remote location.

SUMMARY OF THE INVENTION

In accordance with one embodiment of the invention, there is provided a kiosk for storing items. The storage kiosk comprises a cabinet, a carousel, a plurality of dividers, a drive means for rotating the carousel, and a plurality of latch means. The cabinet has a door defining a front surface of the cabinet. The door includes a plurality of openable panels vertically aligned. The panels are normally in a latched closed position. The carousel is rotatably mounted in the cabinet about a vertical axis and includes a plurality of shelves spaced along the vertical axis. The plurality of dividers are disposed on each of the shelves to define a plurality of compartments on each shelf for receiving items to be stored. The dividers and the shelves, in combination, define a plurality of compartments around the periphery of the carousel. The drive means is for rotating the carousel to bring respective ones of the compartments into alignment with respective ones of the panels. The pluralities of latch means are for selectively latching or unlatching a panel so that can be opened to place or remove an item from the compartment which was brought into alignment with the panel by the drive means.

The kiosk lends itself to fulfilling the objects of the invention pointed out above, as will be hereinafter described in detail.

BRIEF DESCRIPTION OF THE DRAWINGS

In the Figures, some features are shown schematically.

DETAILED DESCRIPTION OF THE INVENTION

Figure 1:
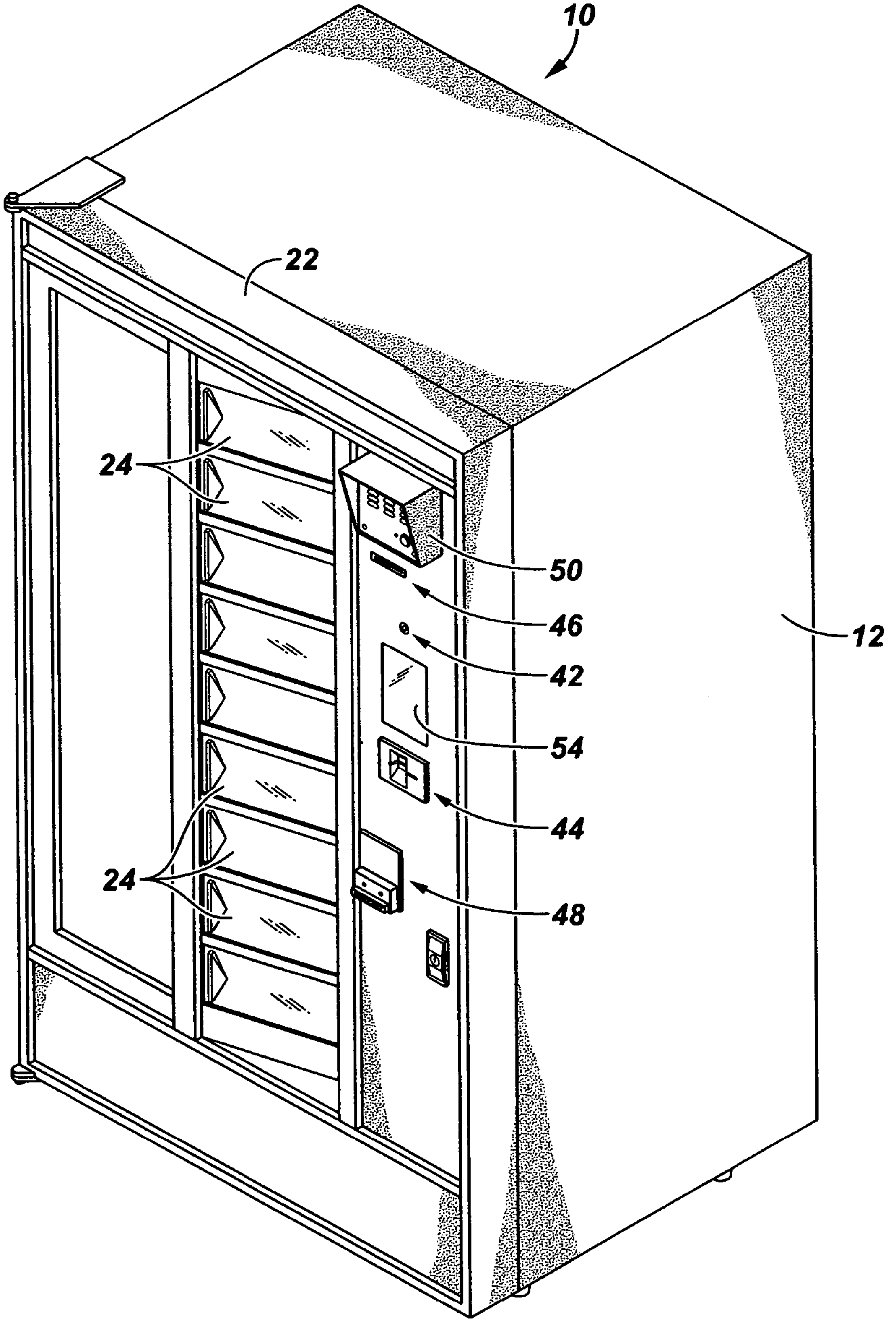
FIG. 1 is a pictorial illustration of a storage kiosk embodying certain features of the present invention.
Figure 2:
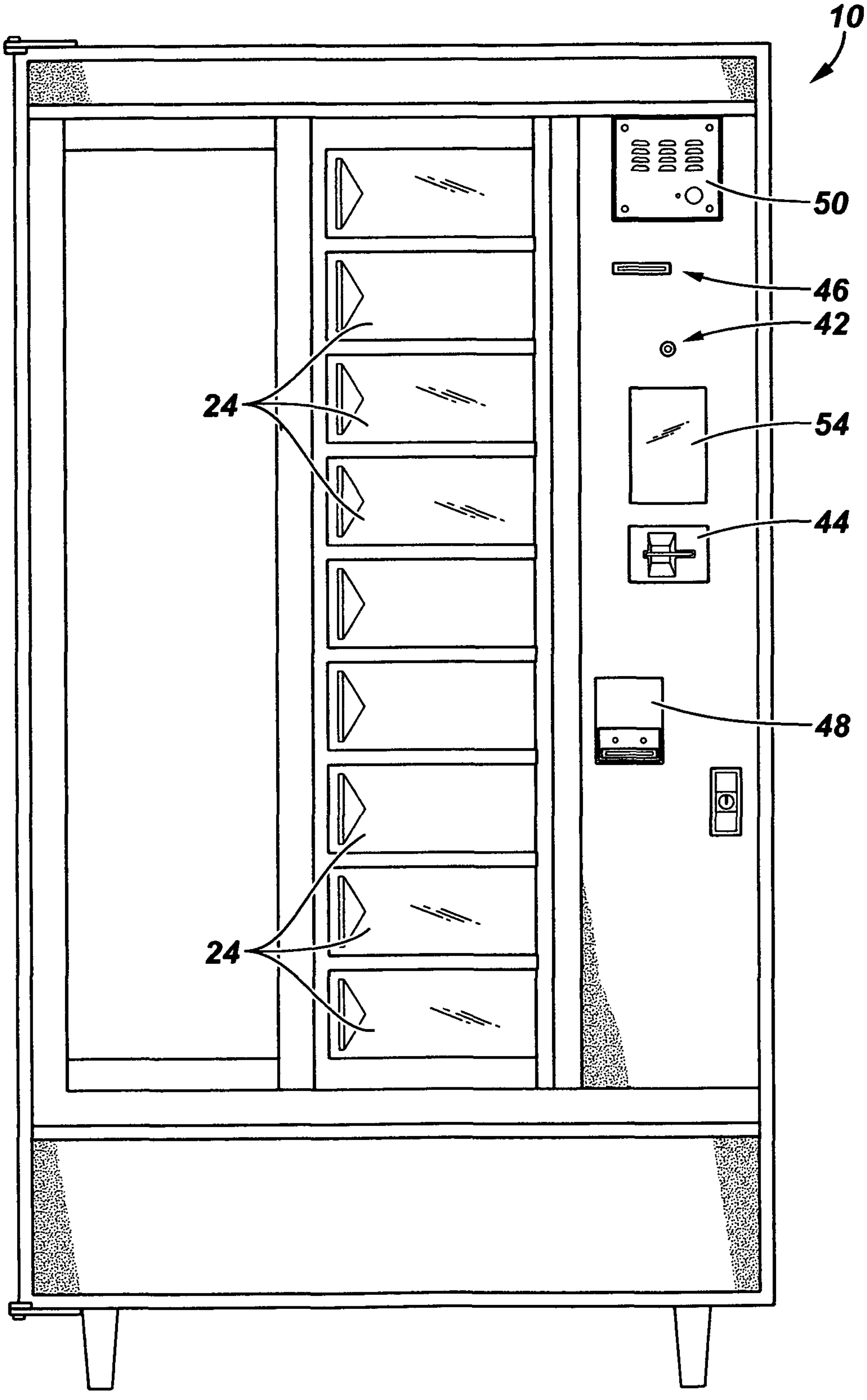
FIG. 2 is a front side view of the storage kiosk shown in FIG. 1.
Figure 3:
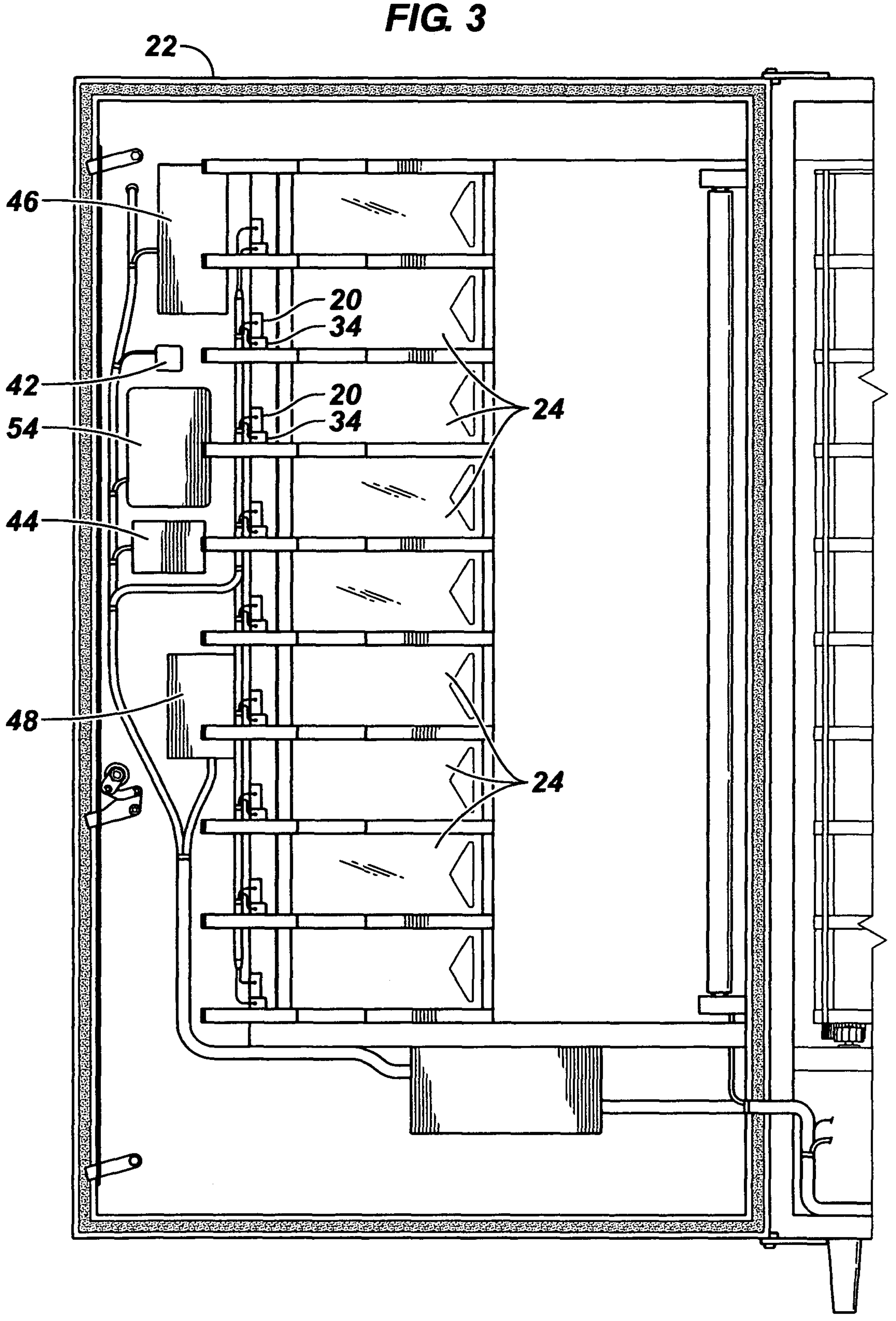
FIG. 3 is a back side view of the door of the kiosk shown in FIGS. 1 and 2.
Figure 4:
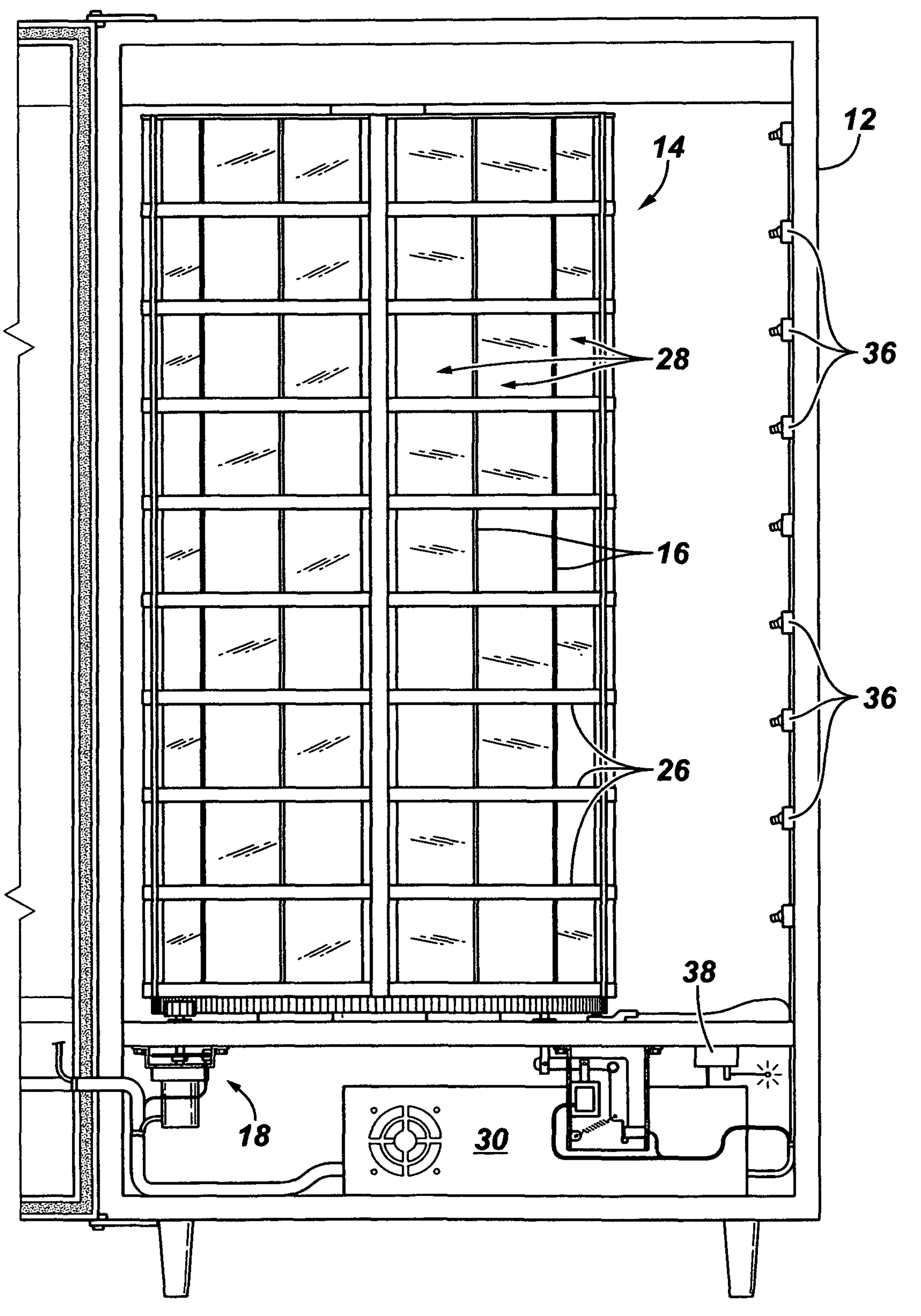
FIG. 4 is a view of the inside of the cabinet of the kiosk shown in FIGS. 1 and 2.
Figure 5:
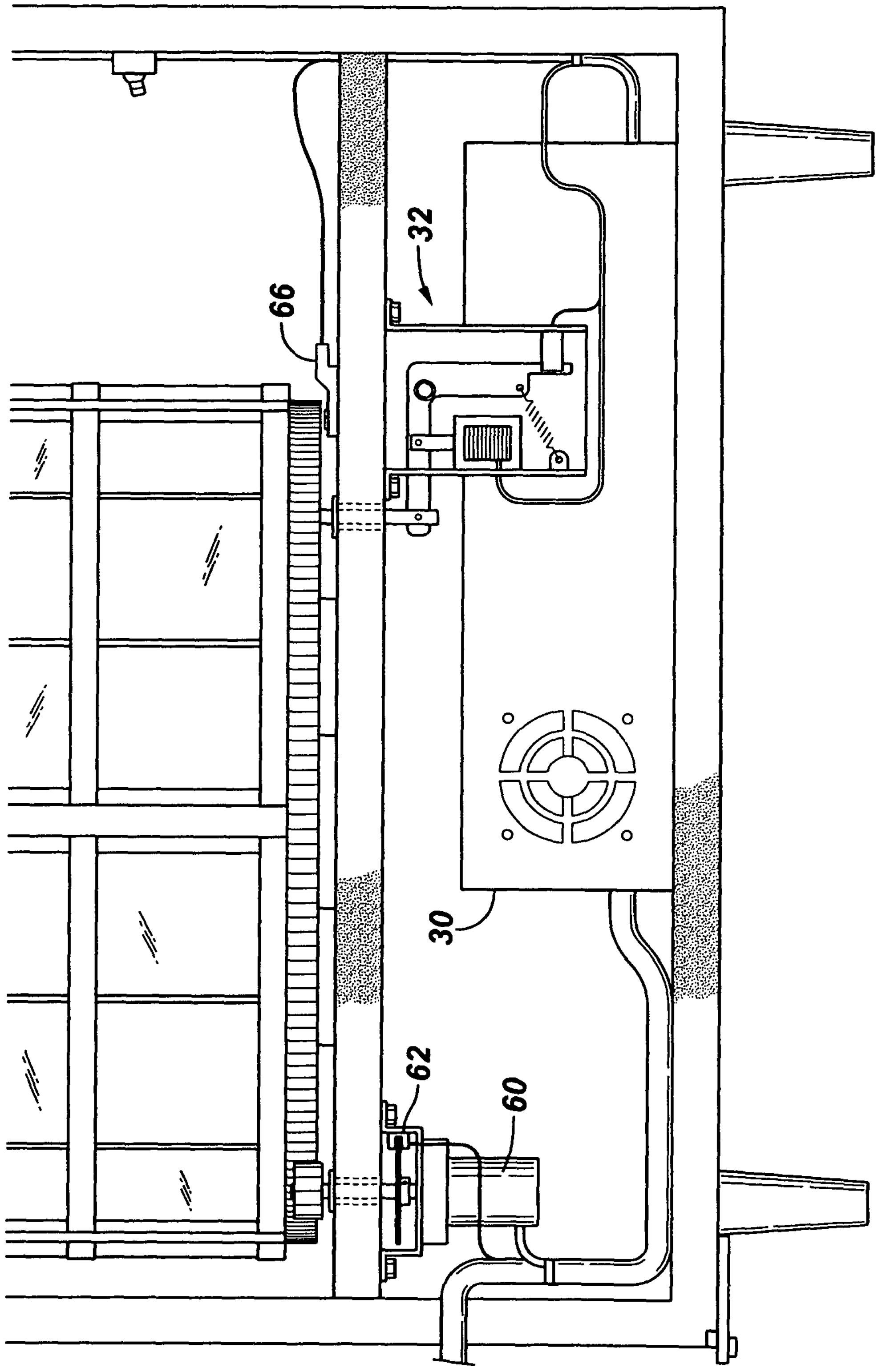
FIG. 5 is a magnified view of a portion of the kiosk shown in FIG. 4.
Figure 6:
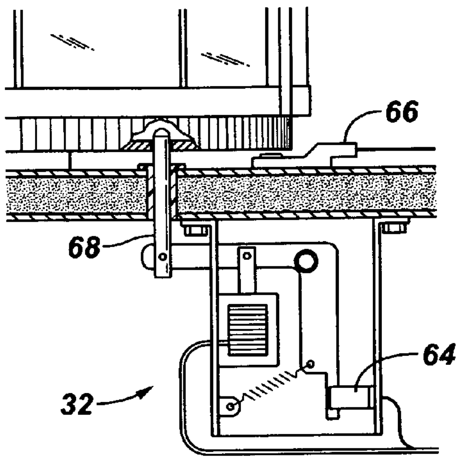
FIGS. 6 and 7 illustrate a brake mechanism for the carousel of the kiosk in an engaged and disengaged position, respectively. All solenoids in the kiosk as illustrated require power to disengage their respective brakes and latches.
Figure 7:
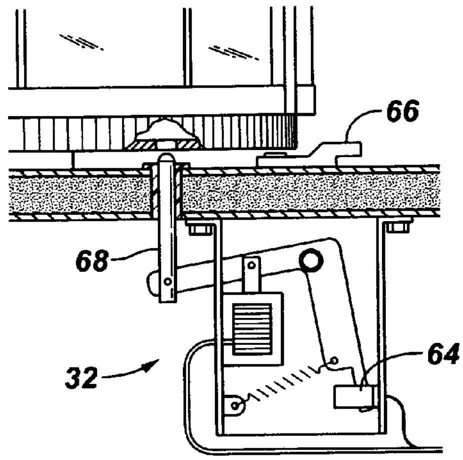

In accordance with one embodiment of the invention, there is provided a kiosk 10 for storing items. The storage kiosk 10 comprises a cabinet 12, a carousel 14, a plurality of dividers 16, a drive means 18 for rotating the carousel, and a plurality of latch means 20. The cabinet has a door 22 defining a front surface of the cabinet. The door includes a plurality of openable panels 24 vertically aligned. The panels are normally in a latched closed position. The carousel is rotatably mounted in the cabinet about a vertical axis and includes a plurality of shelves 26 spaced along the vertical axis. The plurality of dividers 16 are disposed on each of the shelves to define a plurality of compartments 28 on each shelf for receiving items to be stored. The dividers and the shelves, in combination, define a plurality of compartments around the periphery of the carousel. The drive means 18 is for rotating the carousel to bring respective ones of the compartments into alignment with respective ones of the panels. The pluralities of latch means are for selectively latching or unlatching a panel so that it can be opened to place or remove an item from the compartment which was brought into alignment with the panel by the drive means. In the illustrated embodiment, the panels slide open.

In one embodiment of the invention, the storage kiosk is provided with a computer means 30 for assigning, on demand, an available compartment for storage of an item. The computer means further signals the carousel drive means to rotate the assigned compartment into alignment with the plurality of panels, and signals the latch means securing the panel in alignment with the selected compartment to unlatch, permitting access to the available compartment assigned for storage of an item. The computer preferably further signals a brake means 32 to lock the carousel in the aligned position. A sensor 34 in association with each of the latch means securing the panels. The sensor is for preventing the carousel from rotating when the latch is in the unlatched position.

The computer means 30 can be an electronic computer, either desk top, lap top, notebook, hand held or self contained. Evolving computing technology to process the information can be used.

Whether or not a compartment is available for assignment is determined by the computer means according to predetermined criteria. The predetermined criteria include the absence of dissimilar (preferably nonidentical) item retrieval data associated with the compartment in a lookup table accessible by the computer means and used in the routine for assigning compartments.

The process contemplates that the system will include various collection and identification components to record, publish, save, store, transmit and/or maintain the item retrieval data recorded or entered into, by, near, or around the system in order to identify the person or persons wishing to store or retrieve an item of personal or intrinsic value within the system. The item retrieval data can be specific to the person (for example, biometric data such as a voice print, or credit card information) or it can be a randomly generated or selected data string of sufficient complexity so that duplication without prior knowledge is highly unlikely.

The system can operate in real time and post information immediately for data retention but can also operate in off line mode. The system contemplates using delayed posting in certain circumstances.

The system records the information in a database or storage device. The system contemplates using databases and other storage devices to store and/or retain the information. The information can be searchable on any and all data entry points. °

The system contemplates that letters, and/or numbers, or signals can designate if a fee has been paid. The system also contemplates that letters and/or numbers can designate information. The system can also develop and/or assign a unique number and/or letter sequence for every date entry input.

The system contemplates accepting various payment methods that include but are not limited to credit cards, debit cards, check cards, checks, electronic transfers, and/or cash. Electronic payments can be verified locally or through the interne or communications network. The system also contemplates the ability to print various receipts pertaining to the transactions.

The storage kiosk preferably further comprises electronic camera means 36 inside of the cabinet for electronically capturing an image of the selected compartment and any items placed therein. The computer means signals the camera means to electronically capture an image of the selected compartment and any items placed therein in response to a signal from a sensor. The sensor is positioned to trigger the camera when the carousel rotates the just used compartment past the row of cameras. The number of cameras in the row preferably corresponds to the number of shelves on the carousel. Capturing the images of all compartments when the carousel is rotated is contemplated.

The storage kiosk preferably further includes means 38 for electronically transmitting the image of the selected compartment and any items placed therein to a remote location 40. The storage kiosk preferably further comprises means, such as an internal computer clock, for transmitting the image in association with a capture time for the image.

The storage kiosk preferably further includes a second camera means 42 associated with the cabinet for electronically capturing an image of a user of the storage kiosk. The storage kiosk preferably further comprises means for electronically transmitting the image of the user to the remote location 40. The storage kiosk preferably further comprises means, such as an internal computer clock, for transmitting the user image in association with a capture time for the image.

The storage kiosk preferably further comprises a data reader 44 on the front surface of the cabinet for reading item retrieval data presented to it. The reader can be a reader/scanner means for reading, scanning, and/or sensing documents, magnetic strips or other data storage devices or materials for data entry. Desktop, hand held, or evolving data scanning or data entry technology can be used. Voice and/or facial recognition data can be read as well. The data read by the data reader is deemed to constitute the item retrieval data as the term is used herein.

The computer means receives the item retrieval data from the data reader and assigns the item retrieval data to the selected compartment. Computer memory means is provided for recording the assignment of item retrieval data for subsequent look up, if the compartment has not been previously assigned, or the assignment has been cleared. In a preferred embodiment, the data reader reads item retrieval data from credit cards, debit cards, identification cards, and cards issued from a dispenser on the storage kiosk, and retrieval of an item is accomplished by presenting the data reader with the same card at a subsequent time. However, biometric information, for example could be used as well. When the item retrieval data is re-presented, the computer means signals the carousel drive means to rotate the assigned compartment into alignment with the plurality of panels, and then signals the latch means securing the panel in alignment with the selected compartment to unlatch, permitting access to the previously assigned compartment. When the panel is re-closed, the previous assignment of item retrieval data to the compartment is cleared and the compartment is ready for re-use. The data is preferably archived in searchable form.

The item retrieval data can be identity-specific information: The scanned, recorded or entered information can include name, address (city, state, zip, country) and can further include still image, video image, voice capture, or simple numerical information, for example, a PIN. Recording additional information such as identifiers for type of IDs like drivers license, passport, or visa, and/or credit or debit cards, single use or reprogrammable data storage device or evolving identity-specific data can be carried out.

The computer memory means provides for data storage. Data storage for the storage of images, audio, data, and/or other information can be in electronic form, digitally or by analog devices, or by any other information storage method. Recording voice prints and/or audio using current or emerging technology is intended. Analog input is contemplated. The information is converted into digital form if necessary for processing in the computer means or storage. The system contemplates using a secure data storage that can be located in the local computer, remote computer or web-based system. The system also contemplates being able to print, duplicate, transmit, erase, or save any and/or all the information being entered, recorded, transmitted, stored in and/or around the system.

The storage kiosk preferably further comprises a dispenser 46 on the front surface of the panel for dispensing a carrier containing item retrieval data to a user for the purposes of using the storage kiosk.

The storage kiosk preferably further comprises a cash acceptor 48 on the front surface of the panel in operable association with the dispenser so that the carrier containing item retrieval data is issued in response to receipt of a predetermined cash amount by the cash acceptor. The system is intended to accept all forms of electronic payment for fee processing (credit card, debit card, electronic check) or cash. It is intended to accept other emerging forms of financial payment services.

The storage kiosk preferably further comprises a means 50 for demanding carousel access to store an item on the front surface of the panel in operable association with the dispenser so that the carrier containing item retrieval data is issued in response to receipt of a demand signal from the means for demanding access. The control signals for this step can be routed off-site, and the means 50 can be in the form of a voicebox or a telephone, for example.

The means 50 also provides means for demanding carousel access for retrieval of a stored item from the remote site 40. The manned remote location further preferably has access to time-stamped images of users of the storage kiosk and images of items stored and is capable of sending signals from a remote computer means 52 which provides override means for rotating the carousel and unlatching a selected panel from the remote location. The remote site 40 preferably has the capability to issue all the instructions that can be issued by the storage kiosk and it can be located anywhere there is internet access.

The system preferably provides local and/or remote access of the data entered, stored, and/or processed. Digital or analog communications and new or emerging technologies can be used. The system can be operated over a secure or non secure transmission facility to process and/or transmit the information entered. Dialup, wireless and/or dedicated transmission facilities can be used. The system can allow for remote access for notifications, updates or remote control by the system operator. Remote and local alarming for notification of warnings about the system and/or to provide complete remote control can be used. The computer software (computer instructions) developed for the system can reside remotely in a central secure computer or within the on-site computer. The system contemplates using the secure and non-secure web-based applications but is not limited to them. The system contemplates using secure centralized or web-based computers for storage of some and/or all the information. The system contemplates that local software can be present in the on-site computer.

As a safeguard, the remote computer also provides a control for capturing an image of a selected compartment and transmitting the captured image of the compartment back to the remote location, as well as a control for capturing an image of a user of the storage kiosk and transmitting the captured image of the user to the remote location. This information, preferably along with time-stamps, can be used later to match users with their items. The remote computer also can actuate a latch override means to prevent any compartment from unlatching.

It is anticipated that the system will operate on standard electricity, but can operate on DC or a battery system. Battery backup or universal power supply (UPS) can be used.

The computer or data processing system can be password protected for secure operation. Keystroke, voice, image or any emerging technology for security access can be used.

The remote computer can also be employed to program the storage kiosk from a remote location to associate specialized information selected from a number of uses, cost structure, and compartment location with a particular card, so that a particular card can be used more than once, for example, or at a discounted rate, or to access a particular compartment, or compartment of a particular size. The storage kiosk can also be programmed to launch maintenance and trouble-shooting function in response to data read from a particular card.

The storage kiosk preferably further comprises an instruction screen 54 on the front surface of the panel for instructing a user on use of the storage kiosk. The system preferably includes data entry equipment that can be selected from keyboard, mouse, scanner, or touch screen. Data capture equipment such as voice, character, and optical image capture and/or recognition, for example photographic or video capture equipment can also be used. Use of other data entry/capture devices, for example, light pens, infrared, or motion or temperature devices is intended. Evolving data entry/capture devices can be used. The system can allow signature capture through a pen input device. The system contemplates using emerging technologies for signature or acceptance capture. Signature capture can be electronic, analog or digital, auditory, visual or any other means. Use of a touch screen is preferred.

The system can allow for information review on a local basis prior to it being downloaded, saved, stored, transmitted, sent to, or carried to a recipient, or centralized or remote location, IP address, or web-based processor. The system contemplates using various input tools to add, delete, or correct information that has been entered by various means. Information can mean but is not limited to any data, audio, or video.

The system contemplates various methods of offering discounts or price reductions or additions which can include but not be limited to special handling, transmission or receipt confirmation or copies of the information gathered or entered. The system also contemplates additional services and offerings to be developed pertaining to selling, marketing, advertising and/or other uses for the information collected or for the system itself.

The system contemplates setting, allowing, preventing, or adjusting various options based on current or future regulations set forth by local, state or federal government. The system also contemplates permitting access by local, state or federal authorities with or without permission. The process also contemplates that a fee can result from accessing the information. It is expected that the information within the database can be treated as confidential information. However, the process also contemplates that the person or persons providing the information can relinquish their rights to privacy.

Examples of Use of the Kiosk

For use, the system computer(s) are provided with computer instructions for performing the indicated functions. Signals passing between the indicated system components can be direct, or preferably, indirect, via relays or interface boards.

Example 1

Exemplary Use of the Illustrated Device by a Cash Customer to Deposit an Item This example illustrates use of the kiosk with a card issued by the kiosk, and process safeguards to prevent the kiosk from being tampered with.

1. Cash Selected by customer thru input device (e.g., touch screen)
2. Enable Cash Acceptor (computer)
3. Instruct customer to deposit cash (touch screen)
4. Receive cash (cash acceptor)
5. Verify amount (electronically)
6. Capture picture of customer and store in computer memory (camera)
7. Disable cash acceptor (computer)
8. Enable magnetic card dispenser (computer)
9. Dispense Magnetic card (card dispenser)
10. Instruct customer to take card (touch screen)
11. Monitor that the card was taken (card dispenser)
12. Instruct customer to insert magnetic card as shown (touch screen)

13. Confirm card inserted (card reader)
14. Read magnetic card data and store card data (card reader signals computer)
15. Access database to determine available Row and Column (computer)
16. Assign Magnetic card data to this row and column (computer)
17. Release brake pin 68 from carousel via solenoid (computer signals solenoid)
18. Confirm Brake disabled via optical sensor (optical sensor signals computer)
19. Engage Motor 60 (computer signals motor)
20. Verify motor turning via optical counter 62 (counter signals computer)
21. Count motor rotations to verify position (counter signals computer)
22. Release brake prior to desired location (computer signals brake in response to specific optical count)
23. Verify brake deployed via optical sensor 64 (sensor signals computer)
24. Stop motor (computer signals motor)
25. Signal door number (row) to customer (touch screen)
26. Instruct customer to open door (row) (touch screen)
27. Confirm proper door being opened via micro switch 34 (sensor) (sensor signals computer)
28. When opened, release door lock (solenoid) (computer signals solenoid)
29. Begin countdown (20 sec. until door locks) (computer)
30. If no door is opened wait 60 seconds and go to #36 (computer)
31. Monitor door open sensor (micro switch) to confirm door closed (sensor signals computer)
32. Allow customer to select lock door or
33. Count down to 0 seconds and automatically lock door (computer signals solenoid).
34. If door open, instruct customer to close door (computer signals touch screen).
35. If door not closed remain in this position
36. When door closed (verified by switch), engage door lock (solenoid) (switch signals computer, computer signals solenoid)
37. Release brake via solenoid (computer signals brake solenoid)
38. Confirm Brake disabled via optical sensor 64 (sensor signals computer)
39. Engage Motor (computer signals motor)
40. Verify motor turning via optical counter (counter signals computer)
41. Monitor rotation for home sensor 66 (magnetic contact signals computer)
42. Enable internal camera to capture image of item deposited (computer signals camera)
43. Store image (s) (camera signals computer)
44. Release brake (computer signals brake solenoid)
45. Verify brake deployed (optical sensor signals computer)
46. Stop motor (computer signals motor)

Example 2

Exemplary Use of the Illustrated Device by a Courtesy Card Customer to Deposit an Item This example illustrates use of the kiosk at, for example, a plant, where the plant operator has provided the kiosk as a courtesy to plant visitors. The magnetic strip card is issued in response to a demand from the customer using the touch screen.

1. Select Store Your Item (customer selects on touch screen)
2. Display disclaimer (touch screen)
3. Customer either accepts and proceeds or declines and system starts over (customer selects on touch screen)
4. If customer accepts, proceed, if declined, go to 1, (touch screen signals computer)
5. Confirm card dispenser ready (computer signals card dispenser)
6. Enable Cash Accepter (computer signals cash acceptor)
7. Instruct customer to insert and remove magnetic card as shown (touch screen)
8. Confirm card inserted (card reader signals computer)
9. Read card data (e.g. via magnetic strip) and save card data in database (card reader signals computer)
10. Capture picture of customer and save in database (computer signals camera, camera signals computer)
11. Confirm card valid as courtesy card in database or not. (computer) If yes, proceed. If not, display invalid card or declined and tell customer to try again. (touchscreen)
12. Access database to determine available Row and Column (computer)
13. Assign card data to this row and column (computer)
14. Remove card from courtesy database. (computer)
15. Release brake (computer signals brake solenoid)
16. Confirm Brake disabled (brake optical sensor signals computer)
17. Engage Motor (computer signals motor)
18. Verify motor turning (optical counter signals computer)
19. Verify position (e.g., by counting motor rotations—computer)
20. Release brake prior to desired location (e.g., specific spot—computer signals brake solenoid)
21. Verify brake deployed (brake optical sensor signals computer)
22. Stop motor (computer signals motor)
23. Signal door number (row)) to customer (computer signals touch screen)
24. Instruct customer to open door (row) (touch screen)
25. If no door is opened wait 20 seconds and go to #1 (computer)
26. If door opened, Confirm proper door being opened (e.g., via micro switch (sensor signals computer))
27. When opened, begin 20 second countdown (computer)
28. If door is not closed, after 20 Seconds instruct the customer to close the door (computer signals touch screen).
29. Monitor door open (e.g. via micro switch) to confirm door closed (micro-switch sensor signals computer)
30. When door confirmed closed Allow customer to select lock door (touch screen) and/or Count down 20 seconds and automatically lock the door (computer signals solenoid).
31. If door open, instruct customer to close door. (Computer signals touch screen)
32. If door not closed remain in this position
33. When door closed (verified (e.g., via switch)), engage door lock (e.g., via solenoid) (microswitch signals computer, computer signal solenoid)
34. Release brake (e.g. via solenoid) (computer signals brake solenoid)
35. Confirm Brake disabled (e.g. via optical sensor)(optical sensor signals computer)
36. Engage Motor computer signals Motor)
37. Verify motor turning (e.g. via optical counter)(optical counter signals computer)
38. Monitor rotation for home sensor (e.g. via magnetic contact, home sensor signals computer)

39. Enable camera to capture image of item deposited at specific time (computer signals camera)
40. Store image of item deposited (computer signals remote computer)
41. Release brake (computer signals brake solenoid)
42. Verify brake deployed (optical sensor signals computer)
43. Stop motor (computer signals motor)

Example 3

Exemplary Use of the Illustrated Device by a Customer with a Token Card to Deposit an Item The example illustrates use of the device with a reusable card. The system can recognize the card as providing for multiple free uses, or multiple uses for a flat fee, etc. The card can be one provided by the customer which the system has been instructed to recognize.

1. Credit/Debit Selected by customer (touch screen signals computer)
2. Instruct customer to deposit card as shown (computer signals touch screen)
3. Confirm card inserted (card reader signals computer)
4. Read card data (e.g. via magnetic strip) and store card data (card reader signals computer)
5. Confirm Valid Token Card (e.g., via data base) (computer queries memory)
6. Capture picture of customer and store (computer signals camera, camera signals computer)
7. Access database to determine available Row and Column (computer)
8. Assign card data to this row and column (computer)
9. Release brake (e.g., through use of a solenoid)(computer signals brake solenoid)
10. Confirm Brake disabled via optical sensor (optical sensor signals computer)
11. Engage Motor (computer signals motor)
12. Verify motor turning (e.g., by use of an optical counter) (optical counter signals computer)
13. Verify position (e.g., by counting-motor rotations) (counter signals computer)
14. Release brake prior to desired location (e.g., specific optical count)(computer signals brake solenoid)
15. Verify brake deployed (e.g., optical sensor)(optical sensor signals computer)
16. Stop motor (computer signals motor)
17. Signal door number (row) to customer (computer signals touch screen)
18. Instruct customer to open door (row) (touch screen)
19. Confirm proper door being opened (e.g., via micro switch (sensor))(micro switch signals computer)
20. When opened, release door lock (e.g., via solenoid)(computer signals door solenoid)
21. Begin countdown (20 sec. until door locks) (computer)
22. If no door is opened wait 20 seconds and go to #36 (computer)
23. Monitor door open (e.g. via micro switch) to confirm door closed (microswitch signals computer)
24. Allow customer to select lock door or (customer signals touch screen)
25. Count down to 20 seconds and automatically lock the door (computer signals door solenoid).
26. If door open, instruct customer to close door (computer signals touch screen).
27. If door not closed remain in this position (computer)
28. When door closed (verified (e.g., via switch)), engage door lock (e.g., via solenoid)(switch signals computer, computer signals solenoid)
29. Release brake (e.g., via solenoid)(computer signals brake solenoid)
30. Confirm Brake disabled (e.g., via optical sensor)(optical sensor signals computer)
31. Engage Motor (computer signals motor)
32. Verify motor turning (e.g., via optical counter)(optical counter signals computer)
33. Monitor rotation for home sensor (e.g., via magnetic contact)(sensor signals computer)
34. Enable camera to capture image of item deposited (computer signals camera, camera signals computer)
35. Store image (computer)
36. Release brake (computer signals brake)
37. Verify brake deployed (sensor signals computer)
38. Stop motor (computer signals motor)

Example 4

Exemplary Use of the Illustrated Device by a Customer with Credit Card to Deposit an Item This example illustrates use of the kiosk by a customer paying for the service with a credit or other financial institution magnetic strip card. The card used for payment can also be used to retrieve the stored item, or another card can be used. The system recognizes the card used to make the deposit as the card needed to make the retrieval.

1. Select Store Your. Item (touch screen)
2. Display disclaimer (touch screen)
3. Customer either accepts and proceeds, or declines and system starts over (customer signals touch screen)
4. If customer accepts, proceed. If declines, go to 1 (touch screen signals computer)
5. Confirm card dispenser ready (computer signals dispenser)
6. Enable Cash Accepter (computer signals cash accepter)
7. Instruct customer to insert and remove magnetic card as shown (touch screen)
8. Confirm card inserted (card reader signals computer)
9. Read card data (e.g. via magnetic strip) and save card data in database (card reader signals computer)
10. Capture picture of customer and save in database (computer signals camera, camera signals computer)
11. Confirm card valid or not If yes, proceed to 12. If not, display invalid card or declined and tell customer to try again (computer queries remote database, database signals computer, computer signals touch screen).
12. Access database to determine available Row and Column (computer queries memory)
13. Assign card data to this row and column (computer)
14. Release brake (e.g., through use of a solenoid)(computer signals brake solenoid)
15. Confirm Brake disabled (optical sensor signals computer)
16. Engage Motor (computer signals motor)
17. Verify motor turning (e.g., by use of an optical counter) (counter signals computer)
18. Verify position (e.g., by counting motor rotations)(computer)
19. Release brake prior to desired location (e.g., specific spot)(computer signals brake solenoid)
20. Verify brake deployed (e.g., optical sensor)(sensor signals computer)
21. Stop motor (computer signals motor)
22. Signal door number (row) to customer (touch screen)
23. Instruct customer to open door (row) (touch screen)

24. If no door is opened wait 20 seconds and go to #1
25. If door opened, Confirm proper door being opened (e.g., via micro switch (sensor signals computer))
26. When opened, begin 20 second countdown (computer)
27. If door is not closed, after 20 Seconds instruct the customer to close the door (computer signals touch screen).
28. Monitor door open (e.g., via micro switch) to confirm door closed (sensor signals computer)
29. When door confirmed closed Allow customer to select lock door and/or Count down 20 seconds and automatically lock the door. (Computer signals door solenoid)
30. If door open, instruct customer to close door (touch screen)
31. If door not closed remain in this position (computer)
32. When door closed (verified (e.g., via switch)), engage door lock (e.g., via solenoid)(switch signals computer, computer signals solenoid)
33. Release brake (e.g., via solenoid)(computer signals solenoid)
34. Confirm Brake disabled (e.g., via optical sensor)(sensor signals computer)
35. Engage Motor (computer signals motor)
36. Verify motor turning (e.g., via optical counter)(sensor signals computer)
37. Monitor rotation for home sensor (e.g., via magnetic contact)(sensor signals computer)
38. Enable camera to capture image of item deposited at specific time (computer signals camera, camera signals computer)
39. Store image of item deposited (computer)
40. Release brake (computer signals brake solenoid)
41. Verify brake deployed (brake optical sensor signals computer)
42. Stop motor (computer signals motor)

Example 5

Retrieving an Item

This example illustrates that the card used to make the item deposit is recognized as the card authorized to make the withdrawal.

1. Retrieve Selected by customer (customer signals touch screen which signals computer)
2. Instruct customer to deposit card as shown (Does not matter if key card, credit card or courtesy card)(computer signals touch screen)
3. Confirm card inserted (card reader signals computer)

Read card data (e.g., via magnetic strip) and search database (card reader signals computer, computer)

5. Capture picture of customer and store (computer signals camera, camera signals computer)
6. If card is in database, proceed to 6. (Computer) If not, display invalid card and count down 20 seconds If time is up go to 1. (Computer signals touch screen; computer)
7. Access database to determine assigned Row and Column (computer)
8. Release brake (e.g., through use of a solenoid)(computer signals brake solenoid)
9. Confirm Brake disabled (e.g., via sensor)(brake optical sensor signals computer)
10. Engage Motor (computer signals motor)
11. Verify motor turning (sensor signals computer)
12. Verify position (position signals computer)
13. Release brake prior to desired location (e.g., specific spot)(computer signals brake solenoid)
14. Verify brake deployed (e.g., optical sensor signals computer)
15. Stop motor (computer signals motor)
16. Instruct customer to open door (row) (computer signals touch screen)
17. If no door is opened wait 20 seconds and go to #1 Remove card data from stored database. (Computer)
18. If door opened, Confirm proper door being opened (e.g., via micro switch (sensor)) Remove card data from stored database. (Sensor signals computer, computer)
19. When opened, begin 20 second countdown (computer)
20. If door is not closed, after 20 Seconds instruct the customer to close the door (computer, computer signals touch screen).
21. Monitor door open (e.g., via micro switch) to confirm door closed (sensor signals computer)
22. When door close confirmed closed Allow customer to select lock door and/or Count down 20 seconds and automatically lock the door. (Computer signals touch screen, computer signals lock solenoid)
23. If door open, instruct customer to close door (computer signals touch screen).
24. If door not closed remain in this position (computer)
25. When door closed (verified (e.g., via switch)), engage door lock (e.g., via solenoid) (switch signals computer, computer signals solenoid)
26. Release brake (e.g., via solenoid-computer signals brake solenoid)
27. Confirm Brake disabled (e.g., via optical sensor)(sensor signals computer)
28. Engage Motor (computer signals motor)
29. Verify motor turning (e.g., via optical counter)(counter signals computer)
30. Monitor rotation for home sensor (e.g., via magnetic contact)(home sensor signals computer)
31. Enable camera to capture image of storage compartment at specific time (computer signals camera)(camera signals computer)
32. Store image of compartment (Computer)
33. Release brake (computer signals brake solenoid)
34. Verify brake deployed (optical sensor signals computer)
35. Stop motor (computer signals motor)

Example 6

On Site Maintenance Functions

This example illustrates the performance of certain maintenance functions needed to maintain the kiosk. Importantly, it is necessary to remove items from the carousel after more than a predetermined time period, for example, for than 24 hours. The removed items can be stored within the cabinet in the illustrated chamber extending alongside the carousel, so that they remain on site, space permitting. Because of the photographs taken of the user and of the item deposited, and the magnetic card track data, the two can be reunited later, if requested. It is also important to reset the counters.

The kiosk is capable of performing numerous functions to maintain and operate the kiosk. These functions require a specially coded magnetic card (can be made at the kiosk remotely). The maintenance card is inserted and the password entered through a keypad that appears on the touch screen.

Once the proper password is entered, the touch screen displays buttons corresponding to the following choices: STATUS, MAINTENANCE compartments, MORE, CANCEL.

Selecting the STATUS button causes the touch screen to display how much cash has been accepted, bills collected, cards dispensed, transactions that day, and an OK button. If the button OK is selected the window is closed.

Selecting the MAINTENANCE compartments button causes the touch screen to display buttons corresponding to the following choices: Key Cards, Deposit Slips, Ziplock Bags, Tampertight, Maintenance and CANCEL. The choices permit specific compartments be assigned to store supplies of these items.

Selecting the MORE button causes the touch screen to display EMPTY overdue items, RESET counters, VIDEO setup, and CANCEL. This screen permits the video setting desired.

Selecting RESET counters will reset all the counters such as number of card dispensed, bills accepted and total cash in the kiosks. All the numbers reset and the money is expected to be removed from the kiosk. This information is also sent to the home office where deposits can be compared to the funds collected to determine whether theft has occurred.

EMPTY Overdue Items is the most critical in this section. Here's how it operates: The kiosk is designed to store items for no longer than 24 hours. We have the ability to lock a compartment after this time and require the person to pay an additional fee or we can leave the items accessible but this also keeps the compartment unavailable for other use. Our database keeps track of how long the item is stored. When we empty overdue items, the computer knows which items have been in the kiosks for over 24 hours and begins the empty process. It will rotate the carousel to the first column and display the column and door number to open. Our service staff will open that door, and record the column, door number and date associated with the removed item. After all the items are removed from that column, the kiosk rotates to the next column and repeats the process until the kiosk has all overdue items removed and catalogued. When this is done, the computer makes these compartments available for rental and records the data in a stored database for future access.

Example 7

Off Site Diagnostic, Maintenance, and Customer Service Functions

Figure 8:
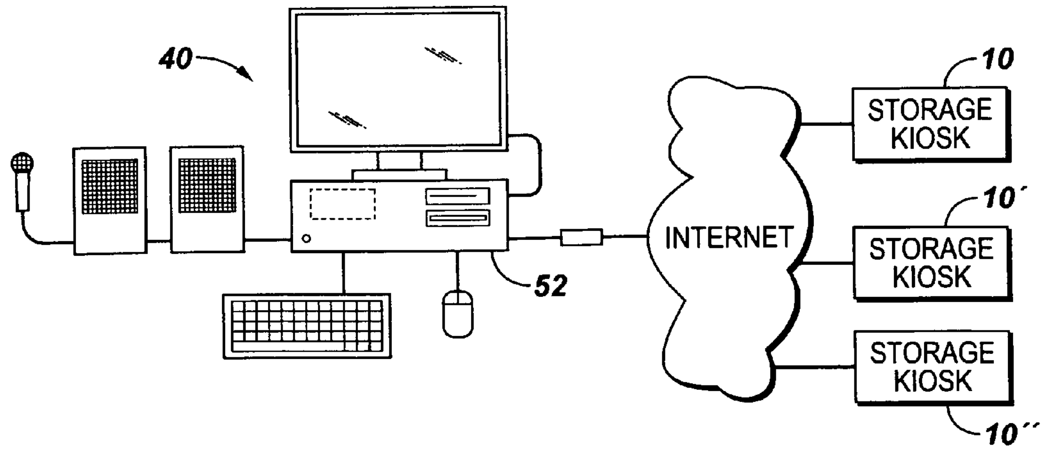
FIG. 8 illustrates schematically a system providing remote operation and customer assistance for a plurality of kiosks from a single control point.

This example illustrates customer service, for example, being provided from an off-site location. See FIG. 8.

The software has a function that can only be accessed by a technician using a computer keyboard 70 connected to the kiosk, either directly, or indirectly, via the internet. A menu screen pops up on the technician's computer 40 that enables the technician to perform several important functions remotely.

1. Close Program—This enables the technician to turn off the program without turning off the computer. This lets the technician do updates, diagnostics, etc without the program running.

2. Video Settings—This allows the technician to remotely change the video software to accommodate the communications line data capacity. Higher speed allows the technician to set higher quality with higher refresh rates. This function allows the technician to look directly at the person standing in front of the kiosk so the technician can visually match this person to the database. It also enables the technician to view any compartment in front of a camera.

3. Manual Open This allows the technician to open the door and access any compartment within the kiosk. This function is used when a card is lost, or damaged or even when the customer locks their card in the compartment.

4. Read Card This allows the technician to read someone's card so the technician can access the data associated with this card. It can also be used to read the card data so the technician can remotely set up that card for specialized functions without having to program a card and send it to the remote location 5. Quick Search/Manual Open This function allows the technician to remotely read a card and display all the transactions associated with that card. The technician will be able to see the deposit and any retrieval associated with that card data. At the same time, the technician can display the info for the person directly in front of the screen so they can see the same info. This info includes the card data, detailed time stamps, the specific storage compartment and pictures of the person who performed the tasks. This function is ideal when someone lost their card, stored their card or even previously opened their compartment. An additional function in the area allows the technician to manually remotely open this compartment based on the information displayed on the screen.

6. Lock Out Compartment This function allows the technician to remotely lock or unlock any compartment and_override the standard operation of the kiosk. It is used to lock a compartment that the technician might suspect has an illegal item or even as a storage compartment the technician can use to store extra cards or supplies.

7. Start Courtesy Transaction This function allows the technician to remotely dispense a free transaction to the person standing in front of the kiosk.

8. Change password This function allows the technician to remotely change the control password for the kiosk disabling service card access. This function is intended to remotely be able to lock out any and all service attendants while access cards are disabled. This function is also intended so that different kiosks can be granted different passwords that can be changed whenever necessary.

9. Card Dispenser Control This function allows the technician direct control of the Key Card dispenser. It allows the technician to remotely reset it and dispense cards without going through the program.

10. Cash Credit Mode This function allows the technician to remotely establish the mode we want the kiosk to operate in. Normal mode allows both cash and credit cards. The technician can choose however to shut off cash or credit independently. If both are turned off the kiosk reports that the service is not available.

Through these functions, the technician can remotely perform almost any customer service function required to assist a customer.

Additional Features of Preferred Embodiments

The system contemplates being a self contained unit or one being capable of being integrated into an existing housing in some public or private area. It is anticipated that the user will or can stand, sit, lie or move in front of the unit in order to make use of the unit.

The system contemplates allowing a user physical storage space which is secured by various means and methods to deposit an item in said space for a period of time which can vary. It is anticipated that the space will be secure and separate from other spaces and will allow multiple users to secure items within specific spaces. It is contemplated that the system or service will allow one to many items to be deposited and/or secured or retrieved through individual uses. If desired, the system can permit a user to re-access a storage compartment for a brief period of time after making a deposit to withdraw or add additional items.

The system contemplates allowing the user or person using the system for securing, storing, retrieving or maintaining their item to see, hear and/or read the instructions or guidelines and can review and confirm information they have entered. It is contemplated that every storage location will be associated or linked to information entered by the users. The information being entered by the user may not be known to the user and they may not be aware of the information they are providing, for example, when they use a card issued by the system.

In order to activate the system it is anticipated that the user will either touch the screen, push a button, lift a handset or be sensed by the system through various means, for example, infrared, motion, or temperature an any emerging technology.

The system contemplates being able to secure payment through various means. This payment can be confirmed immediately or at a later time. Payment can be for time used, space used, or any number of other items or categories for which a payment can be required. It is anticipated that some form of payment is required to utilize the system or service but the system can also operate without payment.

It is contemplated that the system or user can accept, acknowledge or confirm any charges, payment, and/or any of the information entered.

The system contemplates the development of custom software to manage and control the computer system. This software can operate under control of existing or future publicly available software or software yet to be developed. Software which has the ability to operate as stand alone without the need for a main operating system can also be used.

It is anticipated that the secure space provided to the user will be controlled by electrical, electronic, mechanical, electromechanical or any means deemed necessary. The system contemplates that each secure area can only be used by one user at a time but can become available for others when the space is no longer being used. It is anticipated that each user provides their own “key” to secure or open the secure space. The term key is generally a parcel of electronic information, such as a signature, stored or entered data, images, sounds, etc., and is not limited to a physical item. It is anticipated that each secure space will be accessed by a “key” which is custom and unique to the person or persons using it. It is anticipated that the system will include various means and methods in order to maintain the security of the items within the secure areas. These can be but are not limited to information in the data entered or secured and may or may not be known to the user of the system. Securing can mean locking, holding, itemizing, cataloging, protecting, making safe, locking up, keep safe, etc.

The system contemplates seizing or not permitting the return of items placed in the secure area if the items are not retrieved or removed by those depositing them within a predetermined time frame, or in the event that their “key” is overridden or otherwise made invalid for retrieval.

It is contemplated that the secure areas can be modular for expansion. It is also contemplated that the secure areas can be of various sizes in order to hold various size items.

It is contemplated that a person or persons electing to store, hold, deposit or utilize the system will either select to do so by touching or selecting a switch of some fashion or simply securing payment through one of the payment vehicles. The system will recognize this process and either automatically or through prompting guide the user through any required steps. It is anticipated that if the system or service is being used to deposit an item, the system or service will automatically select the area for the item to be deposited and inform the user. The system will automatically revolve, rotate, or position the proper area and allow the user to deposit the item through a depository opening. This opening can be a door, lever, slide or some securing and/or locking vehicle. The system or service will either automatically lock or secure the area or will prompt the user to lock or secure the area.

Not closing the door by any means whether jamming it open or holding it open past the predetermined countdown causes the system to communicate to the user that the door is open and must be closed. The system will remain in this condition until the sensors communicate that the door is closed. Once the door is confirmed closed it is locked and the system communicates to the customer that the deposit portion is complete and the key card used on deposit must be used for retrieval.

All information related to the transaction e.g. XY location, card data, time stamp, digital images, transaction type, etc. . . . is stored and managed in an on-site database, is backed up on site and is emailed to multiple locations. The system incorporates remote access thru the Internet to assist, override and perform manual operations by which the off site attendant can control any or all of the system functions.

It is anticipated that a person or persons electing to retrieve, or reclaim an item previously secured in the system will either select to do so by touching or selecting a switch of some fashion or simply confirming payment through one of the previously used payment vehicles. The system will recognize this process and either automatically or through prompting guide the user through any required steps. It is anticipated that if the system or service is being used to retrieve an item, the system or service will automatically select the area for the item to be retrieved from and inform the user. The system will automatically revolve, rotate, or position the proper area and allow the user to retrieve the item through a secured opening. The opening can be a door, lever, slide or some securing and/or locking vehicle. The system or service will either automatically unlock the area or will prompt the user to open the area.

While certain preferred embodiments of the invention have been described herein, the invention is not to be construed as being so limited, except to the extent that such limitations are found in the claims.

What is claimed is:

1. A storage kiosk for storing items comprising a cabinet having a door defining a cabinet front, said door including a plurality of openable panels vertically aligned, said panels normally being in a latched closed position;

a carousel rotatably mounted in the cabinet about a vertical axis, said carousel including a plurality of shelves spaced along the vertical axis, the number of shelves corresponding to the number of openable panels, a plurality of dividers disposed on each of said shelves to define a plurality of compartments on each shelf for receiving items to be stored, said dividers and said shelves, in conjunction, defining a plurality of compartments around the periphery of said carousel, drive means for rotating said carousel to bring each compartment into alignment with a panel, power latch means for selectively latching or unlatching each panel so that it can be opened to place an item in or remove an item from the compartment which was brought into alignment with the panel by the drive means, computer means for assigning, on demand, an available compartment for storage of an item, computer means for signaling the carousel drive means to rotate the assigned compartment into alignment with a panel, and computer means for signaling the power latch means securing the panel in alignment with the assigned compartment to unlatch, permitting access to the assigned compartment for storage of an item.

2. A storage kiosk as in claim 1 wherein the available compartment is assigned according to predetermined criteria.

3. A storage kiosk as in claim 2 wherein the predetermined criteria include the absence of dissimilar item retrieval data associated with the compartment in a lookup table accessible by the computer means.

4. A storage kiosk as in claim 1 further comprising electronic camera means inside of the cabinet for electronically capturing an image of the assigned compartment and any items placed therein.

5. A storage kiosk as in claim 4 further comprising means for electronically transmitting the image of the assigned compartment and any items placed therein to a remote location.

6. A storage kiosk as in claim 1 further comprising second camera means associated with the cabinet for electronically capturing an image of a user of the storage kiosk.

7. A storage kiosk as in claim 6 further comprising means for electronically transmitting the image of the user to a remote location.

8. A storage kiosk as in claim 1 further comprising a data reader on the front surface of the cabinet for reading item retrieval data presented to it, computer means for receiving the item retrieval data from the data reader and assigning such information to the available compartment, and computer memory means for recording the assignment of information for subsequent look up.

9. A storage kiosk as in claim 8 further comprising a dispenser on the front surface of the panel for dispensing a carrier containing item retrieval data to a user for the purposes of using the storage kiosk.

10. A storage kiosk as in claim 8 further comprising a means for demanding access for item storage use on the front surface of the panel in operable association with the dispenser so that the carrier containing item retrieval data is issued in response to receipt of a demand signal from the means for demanding access.

11. A storage kiosk as in claim 8 further comprising a means for demanding access for retrieval of a stored item on the front surface of the panel in operable association with a manned remote location, said manned remote location further having access to time-stamped images of users of the storage kiosk and images of items stored, said storage kiosk further comprising override means for rotating the carousel, and unlatching a selected panel from the remote location.

12. A storage kiosk as in claim 11 further comprising means actuatable from the remote location for capturing an image of a selected compartment and transmitting the captured image of the compartment to the remote location, means actuatable from the remote location for capturing an image of a user of the storage kiosk and transmitting the captured image of the user to said remote location.

13. A storage kiosk as in claim 8, wherein the data reader reads credit cards, debit cards, identification cards, and cards issued from a dispenser on the storage kiosk, and retrieval of an item is accomplished by presenting the data reader with the same card at a subsequent time.

14. A storage kiosk as in claim 13, wherein the storage kiosk is programmed from a remote location to associate specialized information selected from number of uses, cost structure, and compartment location with a particular card.

15. A storage kiosk as in claim 1 further comprising a data reader on the front surface of the cabinet for reading item retrieval data presented to it, computer memory means associated with the data reader and the computer means for associating item retrieval data read by the data reader with compartment location information for a compartment assigned to the item retrieval data, if a compartment has been previously assigned, computer means for signaling the carousel drive means to rotate the assigned compartment into alignment with the plurality of panels, and computer means for signaling the power latch means securing the panel in alignment with the selected compartment to unlatch, permitting access to the previously assigned compartment.

16. A method of using a storage kiosk as in claim 8, comprising presenting item retrieval data to the data reader, and placing an item to be stored into the assigned compartment.

17. A method of using a storage kiosk as in claim 8, comprising presenting item retrieval data to the data reader, and retrieving a stored item from the assigned compartment.

18. A method of using a storage kiosk as in claim 12, comprising receiving a demand at the remote location for access to a stored item in the kiosk, capturing an image of the user making the demand and displaying the captured image at the remote location, accessing and displaying, at the remote site, a previous image of the user and associating the previous image with an item in storage, and the location of the item, and rotating the carouse and unlatching the panel securing the item from the remote location so that the item can be retrieved by the user.

19. A method of using a storage kiosk as in claim 14, comprising presenting a card containing item retrieval data to the data reader, reading the data with the data reader, associating the read data with specialized information previously associated with the item retrieval data and stored in computer memory, assigning a specialized compartment based on the specialized information, rotating the carousel and unlatching the panel securing the specialized compartment so that the specialized compartment can be accessed.

* * * * *